(12) United States Patent
Franca-Neto

(10) Patent No.: US 6,654,846 B1
(45) Date of Patent: Nov. 25, 2003

(54) HIGH SPEED COMPUTER BUS SYSTEM WITH BI-DIRECTIONAL TRANSMISSION MEDIUM AND INTERFACE DEVICE

(75) Inventor: Luiz M. Franca-Neto, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 511 days.

(21) Appl. No.: 09/712,326

(22) Filed: Nov. 14, 2000

(51) Int. Cl.[7] .......................... G06F 13/40; G06F 13/42
(52) U.S. Cl. ........................ 710/305; 370/908
(58) Field of Search ................... 710/305, 316, 710/317, 300; 712/33; 708/204; 709/253; 370/351, 400, 489, 908

(56) References Cited

U.S. PATENT DOCUMENTS 3,651,473 A  *  3/1972  Faber
5,555,543 A  *  9/1996  Grohoski et al.
5,574,671 A  * 11/1996  Young et al.
6,157,625 A  * 12/2000  Kondo

* cited by examiner

Primary Examiner—Gopal C. Ray
(74) Attorney, Agent, or Firm—Schwegman, Lundberg, Woessner & Kluth, P.A.

(57) ABSTRACT

A high speed data bus for use within a computer system includes a plurality of interface units distributed along a bi-directional transmission medium. Each of the interface units is used to couple at least one functional unit within the computer system to the bi-directional medium. The data bus uses a non-baseband signaling scheme on the bi-directional medium to transfer data between functional units within the computer system. In one embodiment, differential small signal signaling technology is used to enable low voltage operation, power supply noise rejection, and robustness against self-inflicted jitter on the bus. The high speed data bus is preferably configured as a series of point to point communication links between adjacent interface units.

29 Claims, 8 Drawing Sheets

HIGH SPEED COMPUTER BUS SYSTEM WITH BI-DIRECTIONAL TRANSMISSION MEDIUM AND INTERFACE DEVICE

FIELD OF THE INVENTION

The invention relates generally to computer systems and, more particularly, to computer bus structures and techniques for use in providing communication between functional units in a computer system.

BACKGROUND OF THE INVENTION

As digital processor speeds increase, the speed at which data is transferred between functional units within a computer system becomes a performance bottleneck. For example, the speed at which data is transferred between a microprocessor and a memory within a computer system can severely limit the overall processing speed of the computer system. Therefore, there is a need for a method and apparatus that is capable of providing high speed communication between functional units within a computer system.

DETAILED DESCRIPTION

Figure 1:
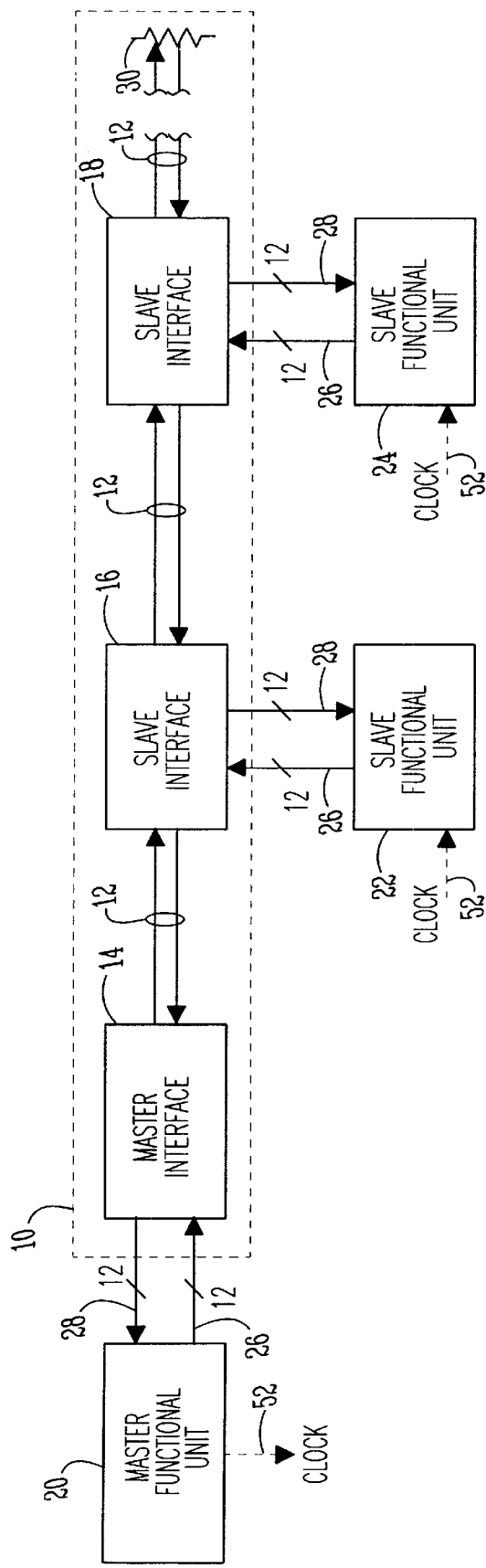
FIG. 1 is a block diagram illustrating a high speed, master/slave computer bus system in accordance with one embodiment of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The present invention relates to a computer bus system that is capable of providing high speed communication between functional units within a computer system. The bus system includes a bi-directional transmission medium and a plurality of interface units for use in coupling information to and from the medium. Each of the interface units provides an interface between at least one functional unit within the computer system and the bi-directional medium. In one approach, the computer bus system is arranged as a series of point-to-point communication links between adjacent interface units. Using this approach, the bi-directional transmission medium is actually made up of a plurality of individual segments. This segmented bus approach enables high speed communication to be achieved between functional units with relatively low jitter. The computer bus system uses non-baseband signaling techniques to transfer data on the bi-directional transmission medium. Each interface unit therefore includes an encoder for encoding baseband information from a corresponding functional unit for delivery to the transmission medium and a decoder for decoding signals received from the transmission medium to recover baseband information for the corresponding functional unit. Functionality is also provided within each interface unit for appropriately sending and receiving signals to/from the bi-directional medium. The computer bus system is capable of providing high performance data transfer within a computer system with relatively low operating voltage and voltage swing. In one embodiment, the bus system is implemented using complementary metal oxide semiconductor (CMOS) technology.

FIG. 1 is a block diagram illustrating a high speed computer bus 10 in accordance with one embodiment of the present invention. As illustrated, the bus 10 includes a high speed, bi-directional transmission medium 12 having a number of interface units 14, 16, 18 coupled at various positions thereon. The interface units 14, 16, 18 each provide a data interface between a corresponding functional unit 20, 22, 24 within the computer system and the bi-directional transmission medium 12. As illustrated, the computer bus 10 is arranged as a series of point-to-point bi-directional communication links between adjacent interface units. That is, there is one point-to-point link between interface unit 14 and interface unit 16, another point-to-point link between interface unit 16 and interface unit 18, and so on. The computer bus 10 of FIG. 1 utilizes a master/slave configuration for providing communication between a single master functional unit 20 and a plurality of slave functional units 22, 24. Thus, the master functional unit 20 can communicate over the bus 10 with any one of the slave functional units 22, 24. The individual slave functional units 22, 24, however, can only communicate with the master functional unit 20, and not the other slave units, over the bus 10. As illustrated, an optional clock line 52 (or pair of lines) may be used to provide data synchronization within the system. As will be described in greater detail, in one embodiment of the invention, a signaling scheme is used on the bi-directional medium 12 that allows timing recovery and data synchronization to be achieved within the system without a dedicated clock line 52.

As used herein, the term "functional unit" refers to any device, component, or subsystem within a computer system that performs a data manipulation, storage, or generation function. The master functional unit 20 of FIG. 1 will typically include some form of digital data processing device such as, for example, a general purpose processor (GPP), a digital signal processor (DSP), a reduced instruction set computer (RISC), a complex instruction set computer (CISC), an application specific integrated circuit (ASIC), a field programmable gate array (FPGA), or other similar device. The slave functional units 22, 24 will typically include devices that can respond to data manipulation, storage, or retrieval requests from the master functional unit 20. In one embodiment, for example, the slave functional units 22, 24 are memory blocks that can be accessed by the master functional unit 20 via the bus 10. As will be apparent to a person of ordinary skill in the art, other types of slave units are also possible.

The transmission medium 12 can include any form of transmission structure that is capable of bi-directional operation at the appropriate communication speed. The transmission medium 12 can be implemented using, for example, wires, cables (e.g., coaxial cable), or conductive lines on the surface of a circuit board. Optical fibers and waveguide structures are also possible. In one approach, a differential transmission structure (e.g., a balanced transmission line) is used to provide enhanced common mode noise rejection on the transmission medium 12. In one embodiment, the various segments of the transmission medium 12 are all implemented using the same type of transmission structure. In an alternative approach, different transmission line types are used between different pairs of interface units. For example, in one scenario, the segment of transmission medium 12 that couples the master interface unit 14 to the first slave interface unit 16 might include co-planar waveguide while the segment that couples the first slave interface unit 16 to the second slave interface unit 18 includes coaxial cable. This approach can be used, for example, if the second slave interface unit 18 is located on a different circuit board from the first slave interface unit 16 and the master slave interface unit 14 (i.e., the coaxial cable provides communication between the two circuit boards). In one implementation, the computer bus 10, the master functional unit 20, and the slave functional units 22, 24 are all located on a common circuit board (e.g., the mother board within a computer system).

In the illustrated embodiment, each of the functional units 20, 22, 24 communicates with a corresponding interface unit 14, 16, 18 via a pair of parallel data paths 26, 28. The first parallel data path 26 carries parallel baseband data from the functional unit 20, 22, 24 to the corresponding interface unit 14, 16, 18 and the second parallel data path 28 carries parallel baseband data in the opposite direction. In an alternative approach, a single bi-directional parallel data path is used. It should be appreciated that serial data communication between the functional units 20, 22, 24 and the corresponding interface units 14, 16, 18 can also be used.

In one embodiment, each of the interface units 14, 16, 18 is integrated with its corresponding functional unit 20, 22, 24 to form a subsystem. For example, in one approach, the master functional unit 20 and the master interface unit 14 (and the corresponding parallel datapaths 26,28) are implemented on a first semiconductor chip to form a first subsystem, the first slave functional unit 22 and the first slave interface unit 16 (and the corresponding parallel data paths 26, 28) are implemented on a second semiconductor chip to form a second subsystem, and so on. The individual bi-directional transmission medium segments 12 are then used to interconnect these subsystems. This approach will typically maximize form factor advantage and increase reliability. It should be appreciated, however, that configurations utilizing interface units that are separate from corresponding functional units also exist.

When the master functional unit 20 delivers baseband data to the master interface unit 14 for transmission on the bus 10, the master interface unit 14 encodes the data into a predetermined transmission format and delivers the encoded signal to the bi-directional transmission medium 12. The encoded signal then propagates along the medium 12 to the first slave interface unit 16. The first slave interface unit 16 decodes the encoded signal and delivers the resulting baseband data to the first slave functional unit 22 via parallel data path 28. In addition, the first slave interface unit 16 relays the encoded signal without decoding onto the next segment of the bi-directional transmission medium 12 toward the second slave interface unit 18. In a similar manner, the second slave interface unit 18 decodes the encoded signal and delivers the resulting baseband data to the second slave functional unit 24 and relays the encoded signal without decoding onto the following segment of the bi-directional transmission medium 12 toward a next interface unit (not shown). This process is then repeated for each subsequent slave functional unit coupled to the bus 10. Eventually, the bi-directional transmission medium 12 is terminated into a matched load 30.

The baseband data received by each of the slave functional units 22, 24 will typically include a request from the master functional unit 20 for data and/or services from one of the slave functional units 22, 24. Each of the slave functional units 22, 24 analyzes the decoded data received from the bus 10 to determine whether a response is required from that unit. If a response is required from a particular slave functional unit 22, 24, the unit delivers response data to the corresponding slave interface unit 16, 18 via parallel path 26. The slave interface unit 16, 18 then encodes the response data and launches the encoded response signal onto the bi-directional transmission medium 12 toward the master functional unit 20. If there are any other slave interface units in the path between the slave interface unit that encoded the response data and the master interface unit 14, those slave interface units will simply pass the encoded signal through without decoding it. The encoded response signal is eventually received by the master interface unit 14 which decodes the signal and delivers the resulting baseband response data to the master functional unit 20.

In one possible scenario, the first and second slave functional units 22, 24 are first and second memory blocks and the master functional unit 20 is a microprocessor. The microprocessor delivers a request to the memory blocks over the bus 10 to retrieve data from a specific location within the second memory block. The first memory block receives the decoded request signal from the first slave interface unit 16 and determines that no response is required. The second memory block receives the decoded request signal from the second slave interface unit 18 and determines that a response is required. The second memory block subsequently retrieves the data from the identified memory location and delivers it to the second slave interface unit 18 via parallel data path 26. The second slave interface unit 18 encodes the retrieved data and launches the encoded data signal onto the bi-directional transmission medium 12 toward the master functional unit 20. The encoded data signal flows through the first slave interface unit 16 and is eventually received by the master interface unit 14. The master interface unit 14 decodes the encoded data signal and delivers the retrieved data to the master functional unit 20 via parallel data path 28.

Figure 2:
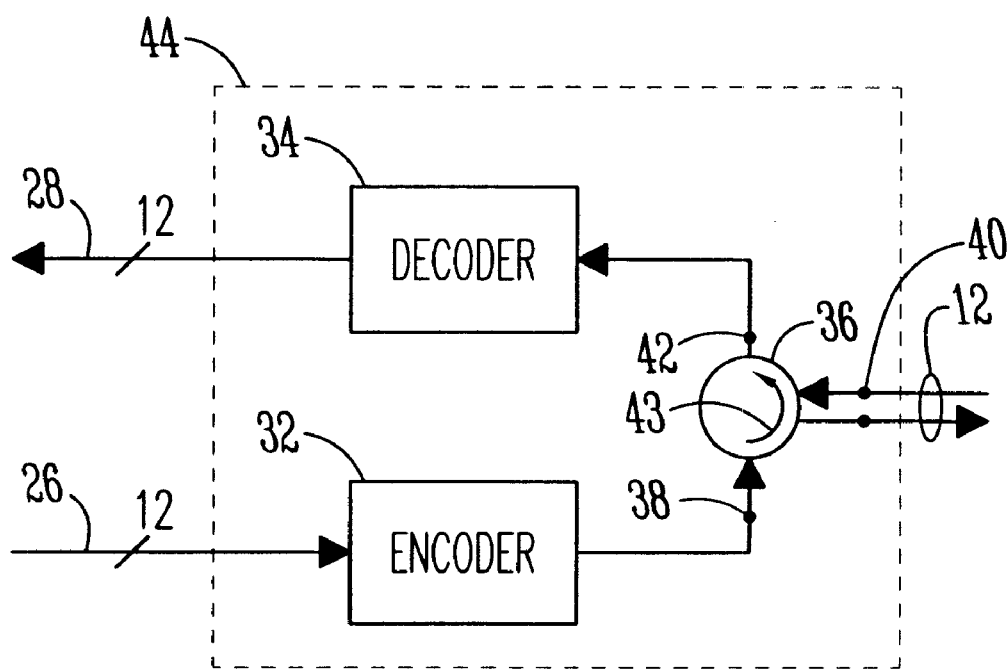
FIG. 2 is a block diagram illustrating a master interface architecture in accordance with one embodiment of the present invention.

FIG. 2 is a block diagram illustrating an interface architecture 44 that is used for the master interface unit 14 of FIG. 1 in one embodiment of the present invention. As shown, the interface architecture 44 includes an encoder 32, a decoder 34, and a half-circulator 36. The encoder 32 is coupled to parallel data path 26 for receiving baseband data from the master functional unit 20. Similarly, the decoder 34 is coupled to parallel data path 28 for delivering baseband data to the master functional unit 20. The encoder 32 and the decoder 34 are each coupled to the bi-directional transmission medium 12 through the half-circulator 36. The encoder 32 encodes the parallel data received from parallel data path 26 and delivers the encoded data signal to port 38 of the half-circulator 36. The encoded data signal flows through the half-circulator 36 and out of port 40 onto the bi-directional transmission medium 12. Similarly, an encoded response signal received at port 40 of the half-circulator 36 from the bi-directional transmission medium 12 will flow through the half-circulator 36 and out of port 42 to the input of the decoder 34. The half-circulator 36 thus acts as a data flow device for appropriately routing the bi-directional signal flow of the transmission medium 12 within the interface 44. It should be appreciated that other types of data flow device can also be used to perform this routing function in accordance with the present invention. The decoder 34 decodes the signal it receives from the half-circulator 36 and delivers the resulting baseband response data to the master functional unit 20 via parallel data path 28. In addition to its use as a master interface unit within a master/slave bus system, the interface architecture 44 of FIG. 2 can also be used as an interface within a point-to-point computer bus system providing communication between two functional units in a computer.

A circulator is a multi-port device that is characterized by its ability to couple energy between adjacent ports in only a single direction. The single direction is typically indicated by an arrow on the circulator symbol. As described above, in one embodiment of the present invention, a "half-circulator" is used as a data flow device within the interface devices. While a full circulator is typically a four port device that can couple energy in a single direction between any two adjacent ports, a half-circulator (as the term is used herein) is a three port device that couples energy in a single direction between only two pairs of ports. Thus, with respect to FIG. 2, a signal input at port 38 of the half-circulator 36 will flow out of port 40 with relatively little attenuation and a signal input at port 40 of the half-circulator 36 will flow out of port 42 with relatively little attenuation. However, a signal input at port 42 will not flow out of port 38. Conventional circulators typically utilize a relatively large, magnetized ferrite member to achieve the above-described circulator properties. A half-circulator, on the other hand, can be implemented using transformers or a combination of amplifiers, adders, and/or subtractors. By using a half-circulator within the interface device, therefore, the size problems often associated with ferrite-based circulators are avoided. A half-circulator is sometimes referred to in the telecommunications industry as a "hybrid."

Figure 3:
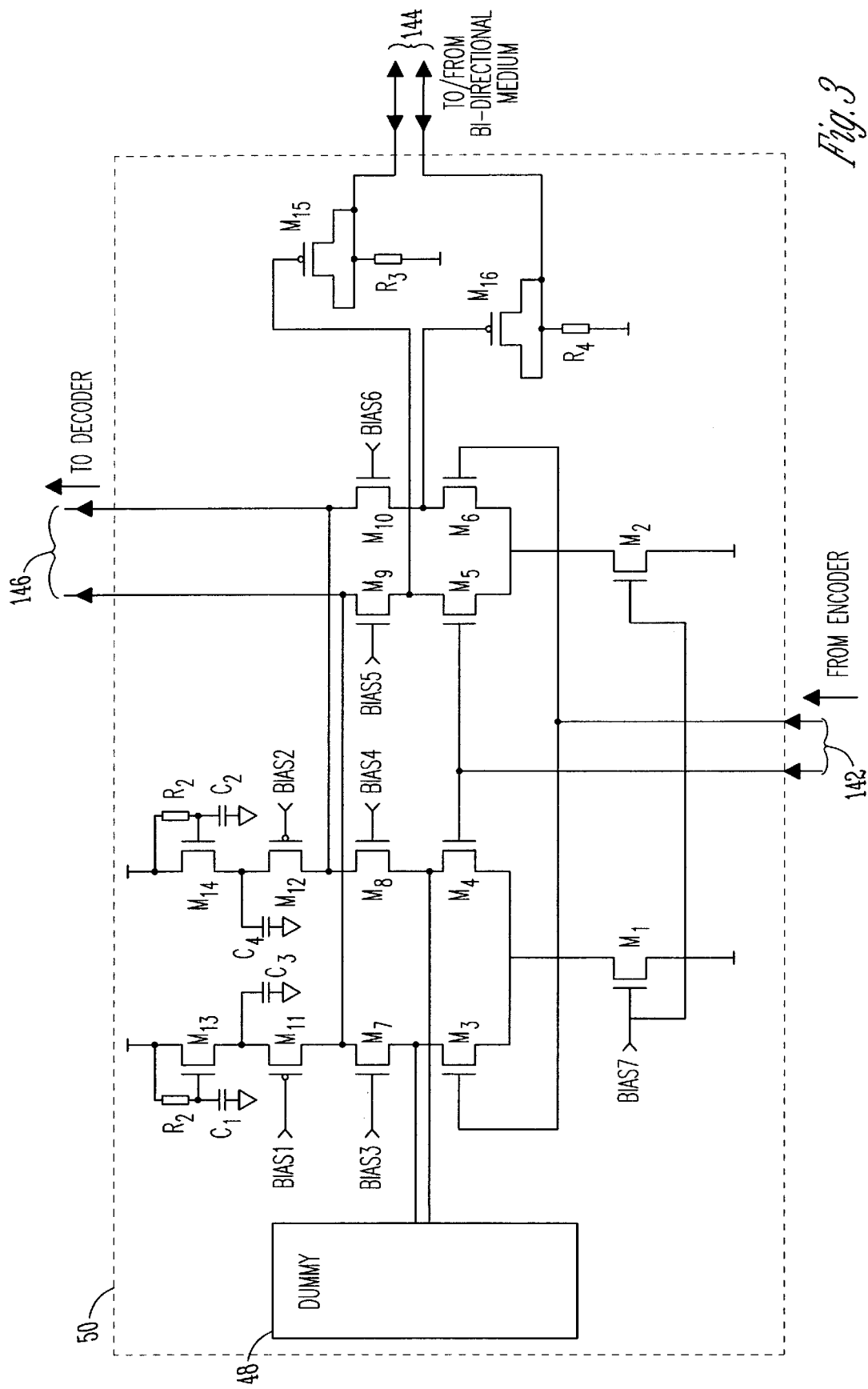
FIG. 3 is a schematic diagram illustrating a fully differential half-circulator circuit in accordance with one embodiment of the present invention.

The half-circulator operates on the principle that a signal being received from a bi-directional medium can be recovered from the medium if the signal currently being transmitted onto the medium is known. The receive signal is recovered by subtracting the signal that it is currently being transmitted onto the medium from the composite signal currently on the bi-directional medium 12. FIG. 3 is a schematic diagram illustrating a half-circulator circuit 50 that is used in one embodiment of the present invention. The half-circulator circuit 50 of FIG. 3 is the subject of a commonly owned, co-pending U.S. patent application. As shown, the half-circulator circuit 50 uses transistor circuitry to achieve the required signal subtraction. The half-circulator circuit 50 uses current-mode signal transmission on the bi-directional transmission medium 12 that allows enhanced performance to be achieved. In addition, the half-circulator circuit 50 uses a fully differential topology that provides common-mode noise rejection and even harmonic distortion cancellation. The half-circulator circuit 50 can be easily integrated onto a semiconductor chip using, for example, CMOS technology. In one embodiment of the invention, the half-circulator 50 is integrated on the same chip as the encoder 32, the decoder 34, and the master functional unit 20.

With reference to FIG. 3, the half-circulator 50 includes a first port 142, a second port 144, and a third port 146. The first port 142 is to be connected to the output of the encoder 32, the second port 144 is to be connected to the bi-directional transmission medium 12, and the third port 146 is to be connected to the input of the decoder 34. The half-circulator 50 transforms a differential voltage signal input at port 142 to a differential current signal that is output onto the bi-directional transmission medium at port 144. Similarly, the half-circulator 50 transforms a differential current signal input at port 144 into a differential voltage signal that is output to the decoder 34 at port 146. The half-circulator 50 uses differential, small-signal signaling within the bus system to allow, among other things, low voltage operation, power supply noise rejection, and robustness against self-inflicted jitter. The voltage swing at the first and third ports 142, 146 is limited so that the transistors within the half-circulator remain in saturation. This low voltage swing allows high performance to be achieved while maintaining relatively low power operation. Transistors M3 and M4 produce current signals that are opposite in phase to current signals produced by transistors M5 and M6, thus precluding the voltage signal entering the first port 142 from developing a differential voltage signal at the third port 146. As shown, a "dummy" circuit 148 is used so that transistors M3 and M4 see the same load as transistors M5 and M6. This guarantees precise current cancellation at the third port 146 for the signal entering the first port 142. In a preferred approach, the dummy circuit 148 is a replica of the half-circulator from the perspective of the bi-directional second port 144.

A differential current signal entering the second port 144 from the bi-directional medium will travel through the transistors M9 and M10 and develop differential voltage levels at the third port 146. Transistors M9 and M10 are sized to terminate the bi-directional medium at the proper real impedance value. Resistors R3 and R4 have high resistance values and are used to ground the conductors of the bi-directional medium. This allows transistors M15 and M16 to operate as alternating current (AC) coupling capacitors. Resistors R1 and R2, capacitors C1 and C2, and transistors M13 and M14 provide for high power supply noise rejection. In a preferred approach, all resistors and capacitors within the half-circulator 50 are implemented using metal oxide semiconductor (MOS) transistors. The half-circulator 50 of FIG. 3 only allows AC coupling to the bi-directional medium, thus providing isolation between the bias signals of the interface units at each end of the medium. One advantage of such an approach is that it allows non-baseband signaling to be used on the bi-directional transmission medium.

Figure 4:
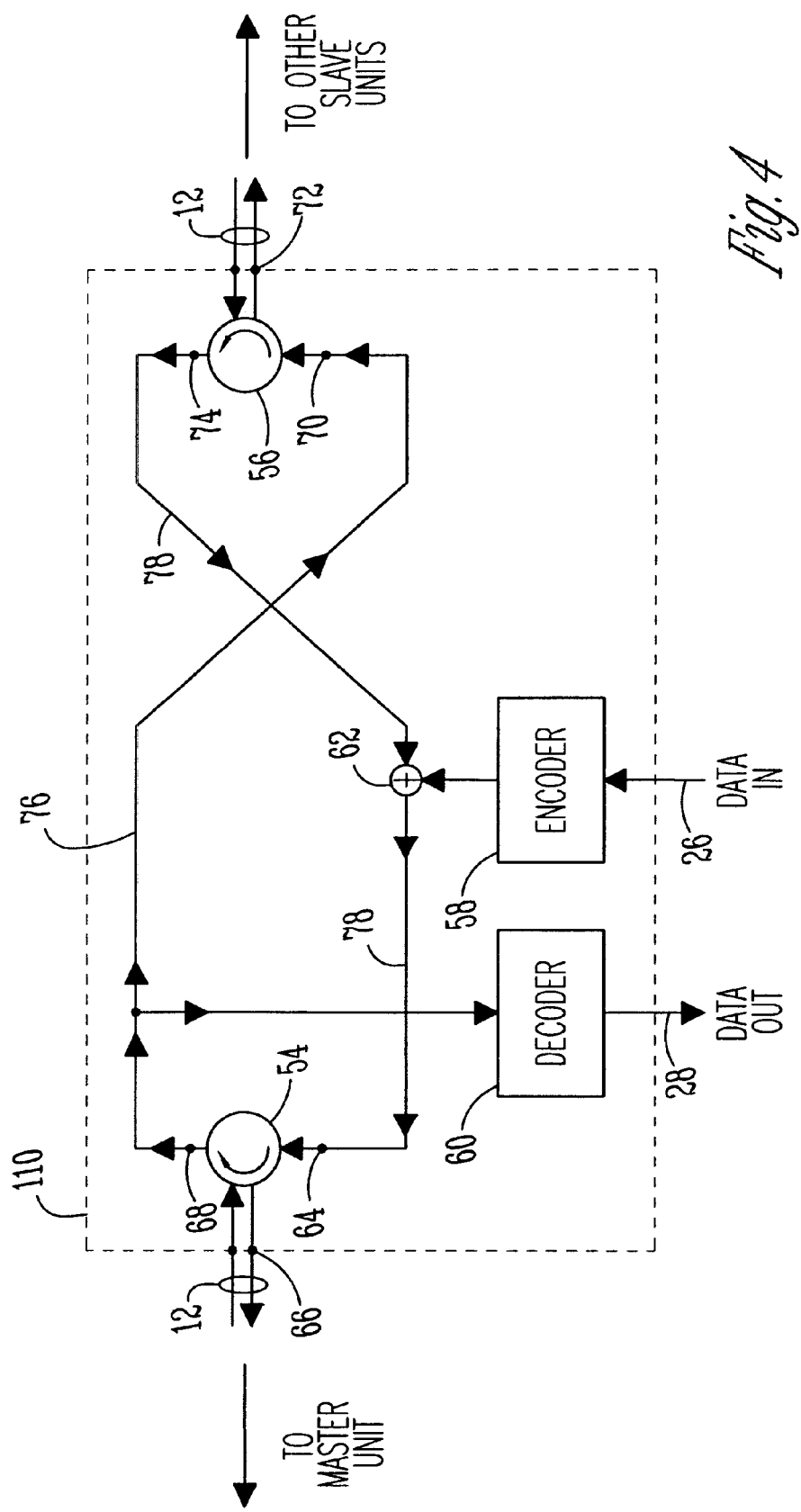
FIG. 4 is a block diagram illustrating a slave interface architecture in accordance with one embodiment of the present invention.

FIG. 4 is a block diagram illustrating an interface architecture 110 that is used for the slave interface units 16, 18 of FIG. 1 in one embodiment of the present invention. As shown, the interface architecture 110 includes: first and second half-circulators 54, 56; an encoder 58; a decoder 60; and an adder 62. The first half-circulator 54 has three ports 64, 66, 68 and the second half-circulator 56 also has three ports 70, 72, 74. Port 66 of the first half-circulator 54 is coupled to the bi-directional transmission medium 12 on the side of the interface unit nearest the master functional unit 20. Port 72 of the second half-circulator 56 is coupled to the bi-directional transmission medium 12 on the opposite side of the interface unit. Port 68 of the first half-circulator 54 is coupled to port 70 of the second half-circulator 56 via line 76. Similarly, port 74 of the second half-circulator 56 is coupled to port 64 of the first half-circulator 54 via line 78 (through adder 62). The decoder 60 has an input that is coupled to line 76 and an output that is coupled to parallel data path 28. The encoder 58 has an input that is coupled to parallel data path 26 and an output that is coupled to line 78 via adder 62. Line 76 and line 78 can include any form of transmission medium that is capable of transmitting signals at the appropriate frequencies. In one embodiment of the invention, line 76 and line 78 each utilize differential transmission structures.

During operation, an encoded signal from the master functional unit 20 is received at port 66 of the first half-circulator 54. The signal flows through the half-circulator 54 and out of port 68 onto line 76. The signal then flows through line 76 to port 70 of the second half-circulator 56. The second half-circulator 56 then launches the signal onto the next segment of the transmission medium 12 from port 72. The decoder 60 also receives the encoded signal from the first half-circulator 54 and decodes the signal. The resulting baseband data is delivered to the corresponding slave functional unit via parallel data path 28. If the slave functional unit determines that a response is required to the baseband data, the unit delivers the response information to the encoder 58 via parallel data path 26. The encoder 58 encodes the response information and delivers the encoded response signal to the adder 62 which injects the encoded signal onto line 78 in the direction of the first half-circulator 54. The first half-circulator 54 then launches the encoded response signal onto the transmission medium 12 from port 66 in the direction of the master unit 20.

If a downstream slave functional unit is delivering data to the master functional unit 20 through the bus 10, an encoded data signal will be received at port 72 of the second half-circulator 56 from the downstream unit. This signal will flow out of port 74 of the second half-circulator 56, through line 78 and adder 62, to port 64 of the first half-circulator 54. The first half-circulator 54 then launches the encoded response signal onto the transmission medium 12 from port 66 in the direction of the master unit 20.

Figure 5:
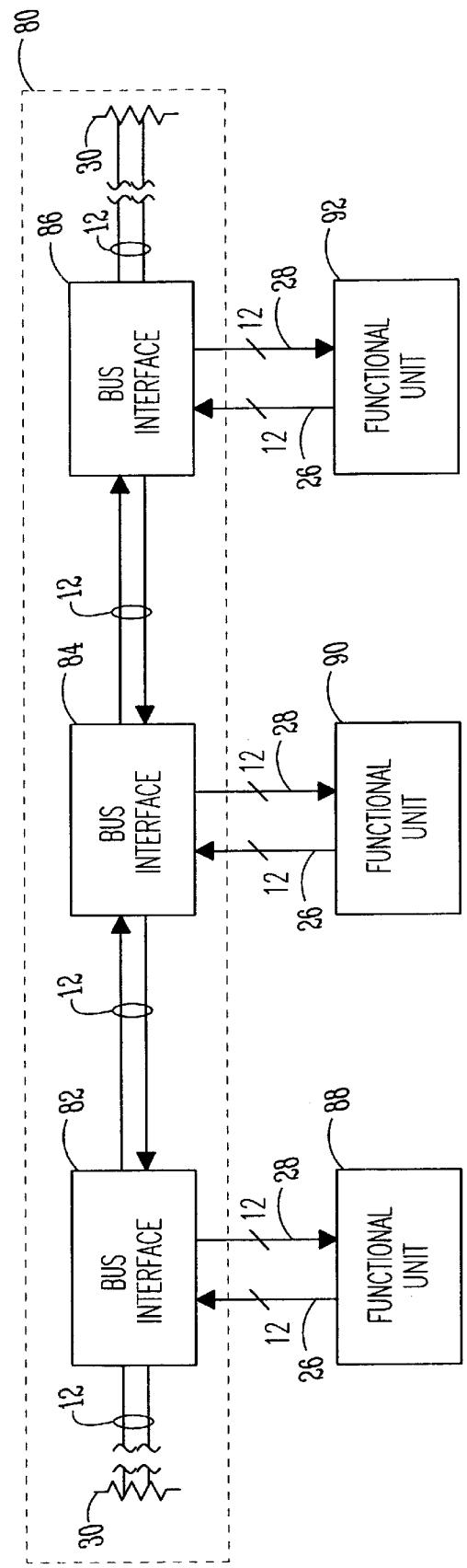
FIG. 5 is a block diagram illustrating a high speed, non-hierarchical computer bus system in accordance with one embodiment of the present invention.

FIG. 5 is a block diagram illustrating a high speed computer bus 80 in accordance with another embodiment of the present invention. Like the bus 10 of FIG. 1, the bus 80 of FIG. 5 includes a high speed, bi-directional transmission medium 12 having a number of discrete interface units 82, 84, 86 coupled at various positions thereon. However, unlike the previously described bus, the bus 80 of FIG. 5 has a non-hierarchical configuration. Thus, each of the functional units 88, 90, 92 coupled to the bus 80 can communicate with each of the other functional units 88, 90, 92 coupled to the bus 80, regardless of physical position on the bus 80. As before, the interface units 82, 84, 86 can each be implemented as an integral part of the corresponding functional unit 88, 90, 92. In addition, as before, an optional clock line (not shown) can be used to distribute a clock signal within the system for use in data synchronization.

Figure 6:
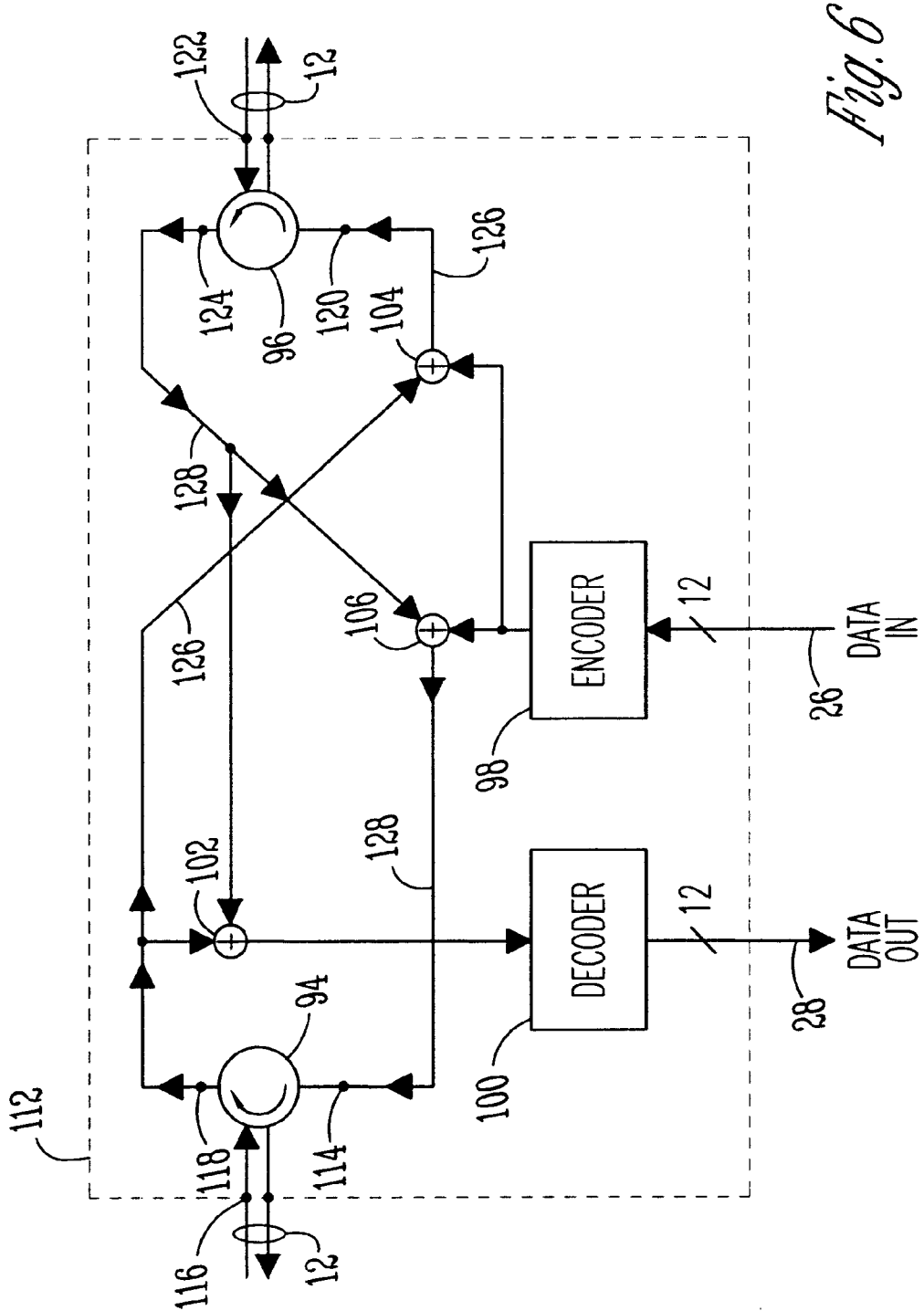
FIG. 6 is a block diagram illustrating a non-hierarchical interface architecture in accordance with one embodiment of the present invention.

FIG. 6 is a block diagram illustrating an interface architecture 112 that is used for the interface units 82, 84, 86 of FIG. 5 in one embodiment of the present invention. As shown, the interface architecture 112 includes: first and second half-circulators 94, 96; an encoder 98; a decoder 100; and first, second, and third adders 102, 104, 106. As before, the first half-circulator 94 has three ports 114, 116, 118 and the second half-circulator 96 has three ports 120, 122, 124. Port 116 of the first half-circulator 94 is coupled to the bi-directional transmission medium 12 on one side of the interface unit and port 122 of the second half-circulator 96 is coupled to the bi-directional transmission medium 12 on the other side of the unit. Port 118 of the first half-circulator 94 is coupled to port 120 of the second half-circulator via line 126 (through adder 104). Similarly, port 124 of the second half-circulator 96 is coupled to port 114 of the first half-circulator 94 via line 128 (through adder 106). Lines 126 and 128 are each coupled to the input of the decoder 100 through adder 102. The output of the encoder 98 is coupled to line 126 through adder 104 and to line 128 through adder 106.

During operation, an encoded signal is received at port 116 of the first half-circulator 94. The encoded signal flows through the first half-circulator 94 and exits at port 118. The signal then travels through line 126 (and adder 104) to port 120 of the second half-circulator 96. The encoded signal is thereafter launched onto the bi-directional transmission medium 12 from port 122 of the second half-circulator 96. The encoded signal is also delivered to the input of the decoder 100 through adder 102. The decoder 100 decodes the signal and delivers the resulting baseband data to the corresponding functional unit via parallel data path 28. In a similar fashion, when an encoded signal is received at port 122 of the second half-circulator 96, the signal flows through the second half-circulator 96 and exits at port 124. The signal then travels through line 128 (and adder 106) to port 114 of the first half-circulator 94. The signal is thereafter launched onto the transmission medium 12 from port 116 of the first half-circulator 94. The encoded signal is also delivered to the input of the decoder 100 through adder 102. The decoder 100 decodes the signal and delivers the result to the corresponding functional unit via parallel data path 28.

When the functional unit coupled to the interface of FIG. 6 decides to deliver a signal to another functional unit on bus 80, it delivers parallel data to the encoder 98 for encoding. The encoder 98 encodes the data and delivers the encoded data signal to each of the adders 104 and 106. Adder 104 injects the encoded data signal onto line 126 in the direction of the second half-circulator 96 and adder 106 injects the encoded data signal onto line 128 in the direction of the first half-circulator 94. The first and second half-circulators 94,96 then launch the encoded data signals onto corresponding segments of the bi-directional transmission medium 12. Thus, the encoded data signal is transmitted from the interface in both possible directions on the transmission medium 12. The signal will thereafter be decoded and analyzed by each of the other functional units coupled to the bus 80.

Figure 7:
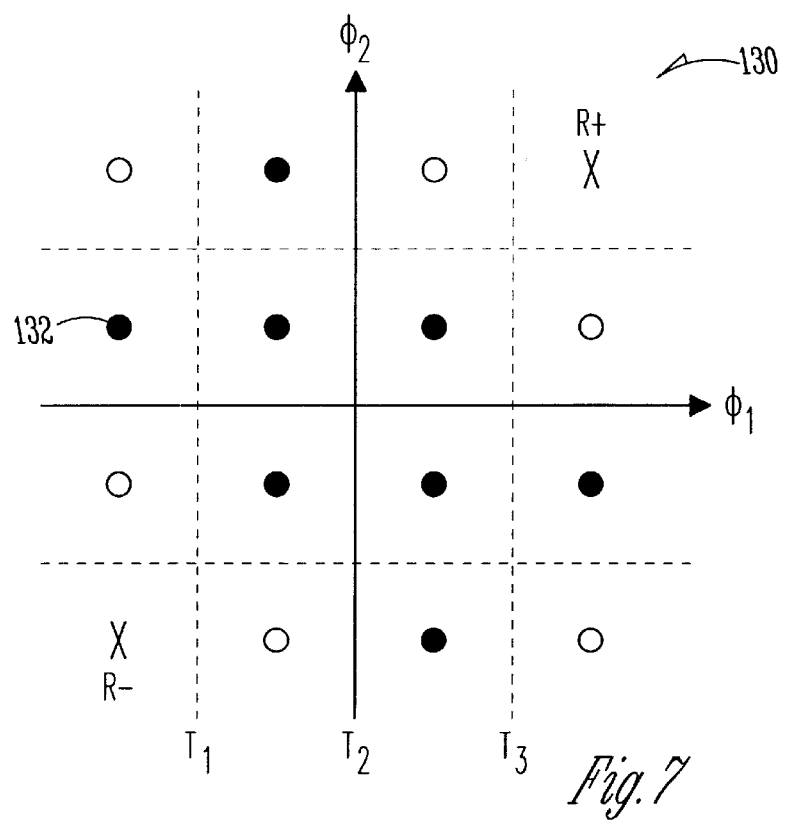
FIG. 7 is a "modified" 16 QAM constellation diagram illustrating a signaling scheme that is used in one embodiment of the present invention.

In one embodiment of the present invention, an m-ary quadrature amplitude modulation (QAM) encoding scheme is utilized to encode data for transmission on the bi-directional transmission medium 12. As is well known, QAM encoding involves a combination of amplitude modulation and phase shift keying. QAM encoding is desirable for use on the transmission medium 12 because it has no direct current (DC) content and can thus provide DC de-coupling between the functional units using the bus. FIG. 7 is a graph illustrating a "modified" 16 QAM constellation 130 that is used in one embodiment of the invention. The constellation 130 includes a plurality of points that each correspond to a unique combination of amplitude and phase that a carrier signal can assume. The $\phi_1$, axis of the constellation corresponds to amplitude and the $\phi_2$ axis corresponds to phase. The points in the constellation 130 indicated by filled circles are each used to represent data on the bus. That is, each filled circle corresponds to a unique data "symbol" within the bus system. Because there are eight filled circles, each data symbol can represent a unique string of three binary bits ($2^3$=8). For example, referring to FIG. 7, it might be decided that symbol 132 represents the binary string 011. Therefore, when it is desired to transmit the string 011 on the transmission medium 12, the carrier signal will be modulated to have the amplitude and phase associated with symbol 132.

Two of the points within the constellation 130 (labeled R+ and R−) are designated as calibration symbols. These symbols are used to set up demodulation thresholds within the bus system and are not used to represent data. In the illustrated embodiment, the two calibration symbols R+, R− correspond to the maximum positive and negative amplitudes of the encoding scheme. The calibration symbols are preferably transmitted as part of each communication on the bi-directional transmission medium 12. In developing the present encoding scheme, it was appreciated that data messages being sent within the bus system may not always include all possible data symbols. Thus, the maximum positive and negative symbol amplitudes may not always be present within received data for use in developing demodulation thresholds. By including the calibration symbols R+, R− in each data transmission, however, the maximum positive and negative amplitudes are always available for developing demodulation thresholds. The overhead in the transmission of the R+ and R− symbols can always be made acceptable.

Figure 8:
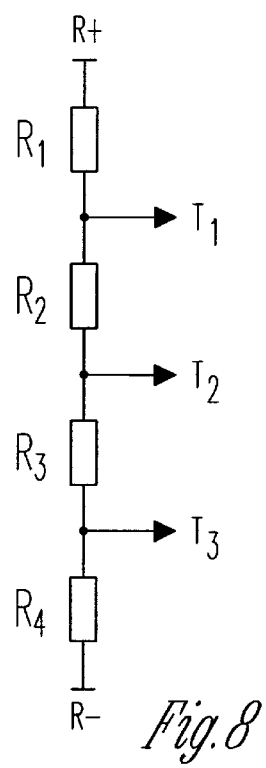
FIG. 8 is a diagram illustrating the creation of demodulation thresholds in accordance with one embodiment of the present invention.

In one approach, the calibration symbols R+, R− are included at predetermined locations within each encoded data signal transmitted on the transmission medium 12. Thus, a decoder receiving a signal from the medium 12 can easily locate the calibration symbols and use them to establish demodulation thresholds for the received signal. Including calibration symbols within transmitted data is important because a decoder will not generally be able to determine the level of attenuation that a received signal has undergone in transit. By establishing the amplitude demodulation thresholds based on a symbol within the received signal itself, the level of attenuation experienced by the signal in transit can be compensated for at the receiver end. Typically, the decoder will measure the amplitudes of the signal portions corresponding to the R+ and R− calibration symbols and then divide the span between the measured amplitudes using evenly spaced amplitude threshold values. An example of such an approach is illustrated in FIG. 8. As shown, three evenly spaced threshold values t1, t2, and t3 are generated by the decoder between the measured amplitude values of R+ and R− to define four amplitude decision regions (R1, R2, R3, R4) for use in demodulating the data within the signal. After the demodulation thresholds have been established, the decoder can begin to extract data from the signal. The decoder measures the amplitude of each data symbol within the received signal and compares the measured amplitude to the corresponding threshold values t1, t2, t3 to determine which decision region the symbol falls within. The relative phase of each data symbol is also measured. The phase and decision region information is then used to determine the content of each data symbol within the received signal.

In one embodiment, the procedure for finding the calibration symbols R+ and R− within a transmitted signal is also used to provide timing recovery and data synchronization within the receiver. That is, the timing between the calibration symbols in the received signal is used to develop a clock within the receiver. Using this approach, a separate dedicated clock line (such as optional clock line 52 of FIG. 1) is not needed. The calibration symbols, however, need to be sufficiently close to one another in time so that adequate timing information is available to reliably generate the clock.

Figure 9:
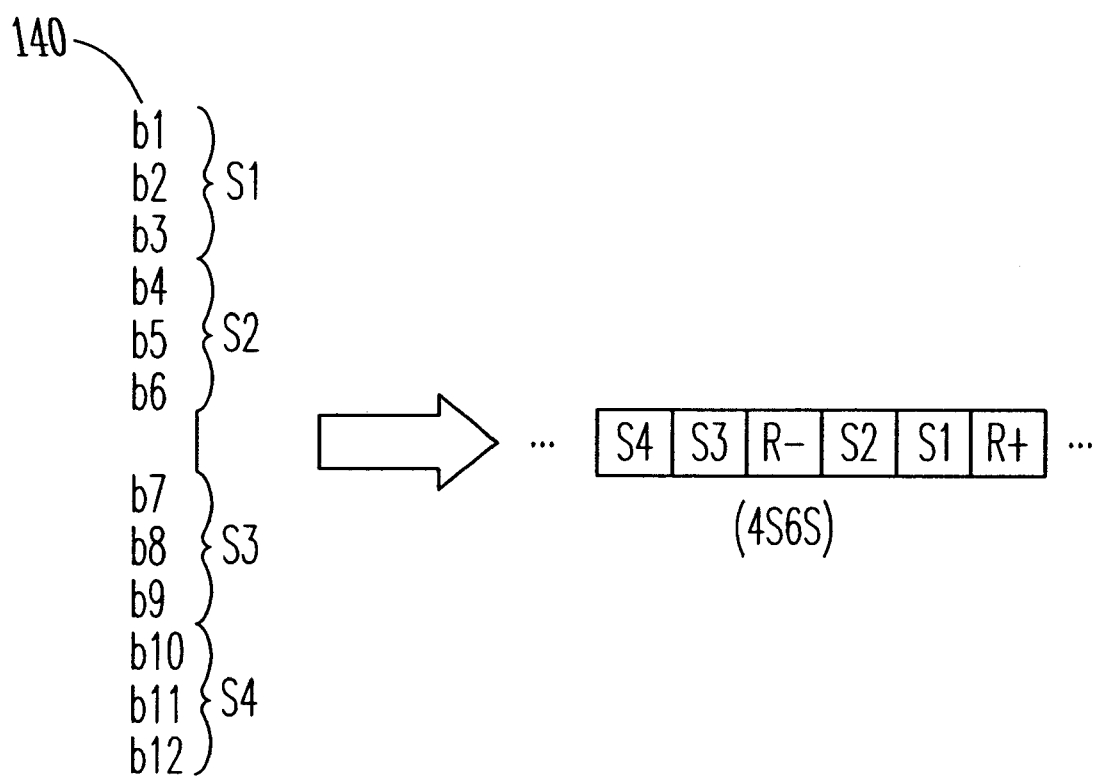
FIG. 9 is a diagram illustrating a four symbol to six symbol data encoding process in accordance with one embodiment of the present invention.

FIG. 9 is a diagram illustrating a data encoding process that is performed in one embodiment of the present invention. This process can be implemented within the encoders (e.g., encoder 32, 58, 98) of the bus to generate encoded data signals for delivery to the bi-directional transmission medium 12. A 12-bit parallel data word 140 is first received from a parallel data path (e.g., parallel data path 26). The 12-bit data word 140 is divided into four 3-bit groups that each correspond to a particular data symbol within the associated encoding scheme (e.g., a particular filled circle within the constellation 130 of FIG. 7). In this manner, the 12-bit data word is transformed into four data symbols S1, S2, S3, and S4. The four data symbols, along with the previously described calibration symbols R+ and R−, are then used to modulate a carrier signal that will subsequently be transmitted onto the transmission medium 12. As described previously, each of the data symbols S1, S2, S3, and S4 and each of the calibration symbols R+, R− has an associated amplitude and phase. The amplitude and phase values corresponding to each of the identified symbols are used to modulate the carrier signal using conventional QAM modulation techniques. In the illustrated embodiment, the carrier is modulated in a sequential fashion starting with the R+ calibration symbol, followed by the first and second data symbols S1.S2, then the R-calibration symbol, and finally the third and fourth data symbols S3, S4. Thus, a four symbol to six symbol (4S6S) encoding scheme is used. Because the calibration symbols R+, R− are evenly spaced within the data stream on the transmission medium 12 and have the largest possible amplitudes within the stream, the symbols are easily identified by the decoders that subsequently receive the signal. Therefore, in addition to their use in establishing demodulation thresholds, the calibration symbols R+, R− may also be used to facilitate synchronization and clock recovery within the decoder. Note that other encoding ratios can alternatively be used (e.g., 6S8S, 10S 12S,etc.) that will reduce the overhead associated with the calibration bits R+ and R−. If the overhead is reduced too far, however, problems with synchronization and detection in the receiver may result. Therefore, a tradeoff between overhead and synchronization performance will generally be made.

Although the present invention has been described in conjunction with certain embodiments, it is to be understood that modifications and variations may be resorted to without departing from the spirit and scope of the invention as those skilled in the art readily understand. For example, the half-circulators within the interface units described herein can be replaced by other signal flow devices that are capable of performing the same basic function including, for example, ferrite-based circulators. Such modifications and variations are considered to be within the purview and scope of the invention and the appended claims.

What is claimed is:

1. A computer bus system to provide data communication between a plurality of functional units within a computer system, comprising:

a bi-directional transmission medium; and a first interface device to couple a first functional unit within the computer system to said bi-directional transmission medium, said first interface device including an encoder to encode baseband data from the first functional unit into a non-baseband signal format before delivering said data to said bi-directional transmission medium.

2. The computer bus system of claim 1 wherein:

said bi-directional transmission medium uses differential small signal signaling to transfer data between functional units within the computer system.

3. The computer bus system of claim 1 wherein:

said encoder includes a modulator to modulate a carrier signal using said baseband data.

4. The computer bus system of claim 1 wherein:

said encoder includes a quadrature amplitude modulation (QAM) unit to encode said baseband data.

5. The computer bus system of claim 4 wherein:

said QAM unit encodes said baseband data based upon a modified QAM constellation, said modified QAM constellation including at least one calibration symbol for insertion into said baseband data for subsequent use in establishing demodulation thresholds, wherein said at least one symbol is not representative of user data.

6. The computer bus system of claim 1 wherein:

said encoder inserts at least one specially coded character into said baseband data during an encoding process for subsequent use in establishing demodulation parameters at a receiver within the system.

7. The computer bus system of claim 1 wherein:

said encoder inserts at least one specially coded character into said baseband data during an encoding process for subsequent use in providing data synchronization at a receiver within the system.

8. The computer bus system of claim 1 wherein:

said first interface device includes a decoder to decode a data signal received from said bi-directional transmission medium before delivering said data signal to said first functional unit.

9. The computer bus system of claim 8 wherein said first interface device includes a data flow device coupled to said encoder, said decoder, and said bi-directional transmission medium, said data flow device to direct signals from an output of said encoder to the bi-directional transmission medium and to direct signals received from the bi-directional transmission medium to an input of the decoder.

10. The computer bus system of claim 9 wherein:

said data flow device includes a transistor circuit to subtract a signal being delivered to the bi-directional transmission medium from a composite signal on the bi-directional transmission medium to recover an incoming signal from the bi-directional transmission medium.

11. The computer bus system of claim 1 comprising:

a second interface device to couple a second functional unit within the computer system to said bi-directional transmission medium; and a third interface device to couple a third functional unit within the computer system to said bi-directional transmission medium;

wherein said bi-directional transmission medium is segmented into a plurality of segments, said bi-directional transmission medium including a first segment between said first and second interface units and a second segment between said second and third interface units.

12. The computer bus system of claim 11 wherein:

said second interface device is a slave interface device to couple a slave functional unit to said bi-directional transmission medium, said second interface device including:

a decoder, a first port coupled to said first segment of said bi-directional transmission medium, and a second port coupled to said second segment of said bi-directional transmission medium, said second interface device to couple a signal received at said first port from said first segment of said bi-directional transmission medium to an input of said decoder and also to said second port for delivery to said second segment of said bi-directional transmission Tedium and to couple a signal received at said second port from said second segment of said bi-directional transmission medium to said first port for delivery to said first segment of said bi-directional transmission medium without coupling said signal received at said second port to said input of said decoder.

13. The computer bus system of claim 12, wherein:

said second interface device includes first and second data flow devices coupled to said first and second ports, respectively.

14. The computer bus system of claim 12 wherein:

said second interface device includes an encoder to encode baseband data received from the slave functional unit to generate encoded data and an adder to deliver said encoded data to said first port for transmission onto said first segment of said bi-directional transmission medium.

15. The computer bus system of claim 11 wherein:

said second interface device is a non-hierarchical interface device to couple a non-hierarchical functional unit to said bi-directional transmission medium, said second interface device including:

a decoder, a first port coupled to said first segment of said bi-directional transmission medium, and a second port coupled to said second segment of said bi-directional transmission medium, said second interface device to couple a signal received at said first port from said first segment of said bi-directional transmission medium to an input of said decoder and also to said second port for delivery to said second segment of said bi-directional transmission medium and to couple a signal received at said second port from said second segment of said bi-directional transmission medium to an input of said decoder and also to said first port for delivery to said first segment of said bi-directional transmission medium.

16. The computer bus system of claim 15 wherein:

said second interface device includes an encoder to encode baseband data received from the non-hierarchical functional unit to generate encoded data, a first adder to deliver said encoded data to said first port for transmission onto said first segment of said bi-directional transmission medium, and a second adder to deliver said encoded data to said second port for transmission onto said second segment of said bi-directional transmission medium.

17. The computer bus system of claim 16 wherein:

said second interface device includes a third adder coupled to said input of said decoder to deliver signals received at said first and second ports to said input of said decoder.

18. A computer bus system to provide data communication between a plurality of functional units within a computer system, comprising:

plurality of interface devices to each provide an interface for at least one functional unit within the computer system;

a bi-directional transmission medium segment between each successive pair of interface devices within said plurality of interface devices to provide a communication path between the pair of interface devices, said computer bus system to deliver data signals between functional units within the computer system using one or more point-to-point communication links between interface device pairs; and wherein said plurality of interface devices includes a first interface device comprising:

an encoder to encode first data received from a corresponding functional unit using a predetermined encoding scheme;

a decoder to decode second data received from the corresponding bi-directional transmission medium segment using a predetermined decoding scheme; and at least one data flow device to couple said encoder and said decoder to said corresponding bi-directional transmission medium segment, said data flow device to direct signals received from said encoder to said corresponding bi-directional transmission medium segment and to direct signals received from said corresponding bi-directional transmission medium segment to the decoder.

19. The computer bus system of claim 18, wherein:

said plurality of interface devices includes an interface device that is integral with a corresponding functional unit.

20. The computer bus system of claim 18, wherein:

said plurality of interface devices are each integral with a corresponding functional unit.

21. The computer bus system of claim 18, wherein:

said at least one data flow device includes a transistor circuit to subtract a signal being delivered to the corresponding bi-directional transmission medium segment from a composite signal on the corresponding bi-directional transmission medium segment to recover an incoming signal from the corresponding bi-directional transmission medium segment.

22. The computer bus system of claim 18, wherein:

said at least one data flow device includes a current mode signal transmission device for launching a current mode encoded data signal onto said corresponding bi-directional transmission medium segment.

23. A computer system comprising:

a plurality of functional units;

a bi-directional transmission medium; and a plurality of interface devices coupled to said bi-directional transmission medium, each of said plurality of interface devices to provide an interface between at least one of said plurality of functional units and said bi-directional transmission medium, each of said plurality of interface devices including an encoder to encode data from a corresponding functional unit into a non-baseband format before delivering said data to said bi-directional transmission medium.

24. The computer system claimed in claim 23, wherein:

said bi-directional transmission medium uses differential small signal signaling to transfer data between functional units within the computer system.

25. The computer system claimed in claim 23, wherein:

each of said plurality of interface devices includes a decoder to decode data received from said bi-directional transmission medium before delivering said data to a corresponding functional unit.

26. The computer system claimed in claim 23, wherein:

each of said plurality of interface devices includes a data flow device coupled to said encoder, said decoder, and said bi-directional transmission medium to direct signals received from an output of said encoder to the bi-directional transmission medium and to direct signals received from the bi-directional transmission medium to an input of the decoder, said data flow device including a transistor circuit to subtract a signal being delivered to the bi-directional transmission medium from a composite signal on the bi-directional transmission medium to recover an incoming signal from the bi-directional transmission medium.

27. The computer system of claim 23 wherein:

said plurality of interface devices includes at least one interface device that is integral with a corresponding functional unit.

28. The computer system of claim 23 wherein:

said encoder inserts specially coded characters into said data during an encoding process for subsequent use in data synchronization and detection within a receiver in the computer system.

29. The computer system of claim 23 comprising:

a dedicated clock line for distributing a clock signal to said plurality of functional units for use in data synchronization and detection.

* * * * *

UNITED STATES PATENT AND TRADEMARK OFFICE
CERTIFICATE OF CORRECTION

PATENT NO. : 6,654,846 B1
DATED : November 25, 2003
INVENTOR(S) : Franca-Neto

It is certified that error appears in the above-identified patent and that said Letters Patent is hereby corrected as shown below:

Column 11,
Line 42, insert -- : -- after "wherein".

Column 12,
Line 16, delete "Tedium" and insert -- medium --, therefor.

Column 13,
Line 4, insert -- a -- before "plurality".

Signed and Sealed this

Twenty-second Day of June, 2004

JON W. DUDAS
*Acting Director of the United States Patent and Trademark Office*